United States Patent
Wang

(10) Patent No.: US 11,003,255 B2
(45) Date of Patent: May 11, 2021

(54) CONTEXT-DEPENDENT TOUCHBANDS

(71) Applicant: Yong Wang, Fremont, CA (US)

(72) Inventor: Yong Wang, Fremont, CA (US)

(*) Notice: Subject to any disclaimer, the term of this patent is extended or adjusted under 35 U.S.C. 154(b) by 4 days.

(21) Appl. No.: 16/286,387

(22) Filed: Feb. 26, 2019

(65) Prior Publication Data

US 2020/0272245 A1 Aug. 27, 2020

(51) Int. Cl.

| | | |
|---|---|---|
| *G06F 3/048* | (2013.01) | |
| *G06F 3/02* | (2006.01) | |
| *G06F 3/0486* | (2013.01) | |
| *G06F 3/0482* | (2013.01) | |
| *G06F 3/0354* | (2013.01) | |
| *G06F 3/0488* | (2013.01) | |
| *G06F 1/16* | (2006.01) | |

(52) U.S. Cl.
CPC .......... *G06F 3/0219* (2013.01); *G06F 1/1692* (2013.01); *G06F 3/03547* (2013.01); *G06F 3/0482* (2013.01); *G06F 3/0486* (2013.01); *G06F 3/04883* (2013.01); *G06F 2203/04808* (2013.01)

(58) Field of Classification Search
None
See application file for complete search history.

(56) References Cited

U.S. PATENT DOCUMENTS

| | | | | | |
|---|---|---|---|---|---|
| 5,581,670 | A * | 12/1996 | Bier | ...................... | G06F 3/0481 345/629 |
| 5,666,499 | A * | 9/1997 | Baudel | .................. | G06F 3/0481 345/157 |
| 5,689,667 | A * | 11/1997 | Kurtenbach | .......... | G06F 3/0482 715/810 |
| 7,358,956 | B2 * | 4/2008 | Hinckley | ................ | A63F 13/06 345/156 |
| 9,207,806 | B2 * | 12/2015 | Burtner | .................. | G06F 3/0416 |
| 9,367,151 | B2 * | 6/2016 | McKillop | ............... | G06F 3/041 |
| 9,417,716 | B2 * | 8/2016 | Ludwig | ............... | G06F 3/04845 |
| 9,792,040 | B2 * | 10/2017 | Fitzmaurice | ........ | G06F 3/04842 |
| 2009/0079693 | A1 * | 3/2009 | Monney | ................ | G06F 3/0312 345/157 |
| 2009/0079711 | A1 * | 3/2009 | Monney | .............. | G06F 3/03543 345/184 |
| 2016/0259433 | A1 * | 9/2016 | Stephenson | ......... | G06F 3/03543 |

* cited by examiner

*Primary Examiner* — Sunit Pandya

(57) ABSTRACT

A computer system comprises a keyboard with a plurality of touchbands, each of which is a narrow multi-touch touchpad, a display device and a computer touchband device application program executable on the computer processor configured to manage a multi-level context-dependent cascading menu interface wherein each menu item includes a plurality of drag-control functions, a plurality of tap commands and a plurality of submenu items; specify a plurality of menu operations, a plurality of control-drag operations and a plurality of command-tap operations from the multi-touch gestures on the touchbands; move the highlight in the menu structure based on the menu operations and display highlighted menu item contents under the active menu layer; change the value of the specified drag-control function listed for the highlighted menu item when detected a control-drag operation; trigger the specified tap command listed for the highlighted menu item when detected a command-tap operation.

17 Claims, 14 Drawing Sheets

Table 1: The operation assignment for a single horizontal context-dependent touchband

| Operation Name | Gesture Assignment | Operation Function |
|---|---|---|
| Menu-down | One-finger mini-down drag | Move the hightlight down to the submenu layer |
| Menu-up | One-finger mini-up drag | Move the highlight up to the parent menu item |
| Menu-right | One-finger tap | Move the highlight to the adjacent menu item on the right in the active menu layer |
| Menu-left | One-finger double tap | Move the highlight to the adjacent menu item on the left in the active menu layer |
| Menu-on/off | One-finger long press | Toggle menu_Display value |
| 1st control-drag | One-finger horizontal drag | Change the 1st drag-control function value |
| 2nd control-drag | Two-finger horizontal drag | Change the 2nd drag-control function value |
| 3rd control-drag | Three-finger horizontal drag | Change the 3rd drag-control function value |
| 1st command-tap | Two-finger tap | Trigger the 1st tap command |
| 2nd command-tap | Two-finger double tap | Trigger the 2nd tap command |
| 3rd command-tap | Three-finger tap | Trigger the 3rd tap command |
| 4th command-tap | Three-finger double tap | Trigger the 4th tap command |
| 5th command-tap | Two-finger long press | Trigger the 5th tap command |
| 6th command-tap | Three-finger long press | Trigger the 6th tap command |

Table 1: The operation assignment for a single horizontal context-dependent touchband

| Operation Name | Gesture Assignment | Operation Function |
|---|---|---|
| Menu-down | One-finger mini-down drag | Move the hightlight down to the submenu layer |
| Menu-up | One-finger mini-up drag | Move the highlight up to the parent menu item |
| Menu-right | One-finger tap | Move the highlight to the adjacent menu item on the right in the active menu layer |
| Menu-left | One-finger double tap | Move the highlight to the adjacent menu item on the left in the active menu layer |
| Menu-on/off | One-finger long press | Toggle menu_Display value |
| $1^{st}$ control-drag | One-finger horizontal drag | Change the $1^{st}$ drag-control function value |
| $2^{nd}$ control-drag | Two-finger horizontal drag | Change the $2^{nd}$ drag-control function value |
| $3^{rd}$ control-drag | Three-finger horizontal drag | Change the $3^{rd}$ drag-control function value |
| $1^{st}$ command-tap | Two-finger tap | Trigger the $1^{st}$ tap command |
| $2^{nd}$ command-tap | Two-finger double tap | Trigger the $2^{nd}$ tap command |
| $3^{rd}$ command-tap | Three-finger tap | Trigger the $3^{rd}$ tap command |
| $4^{th}$ command-tap | Three-finger double tap | Trigger the $4^{th}$ tap command |
| $5^{th}$ command-tap | Two-finger long press | Trigger the $5^{th}$ tap command |
| $6^{th}$ command-tap | Three-finger long press | Trigger the $6^{th}$ tap command |

| 76 | | 77 | | | 78 | | | 79 | |
|---|---|---|---|---|---|---|---|---|---|
| System | White Balance | Tone | Presence | Tone Curve | Color | Sharpening | Noise Reduction | Camera Calibration | |
| Page | | Undo/Redo | | Media | | Vertical Scroll | Horizontal Scroll | Volume 87% | Zoom/ Rotate |
| Back | For | Undo | Redo | Mute | Pause | | | | |

| Zoom/Rotate | | | | | | |
|---|---|---|---|---|---|---|
| Delete | | Home/End | | Undo/Redo | Zoom | Rotate | Brightness |
| Del | BkSp | Home | End | Undo | Redo | 150% | -90 | 92 |

| System | White Balance | Tone | Presence | Tone Curve | Color | Sharpening | Noise Reduction | Camera Calibration | | | | | | |
|---|---|---|---|---|---|---|---|---|---|---|---|---|---|---|
| Undo/Redo | | Hue +2 | | Saturation +4 | | Luminance -2 | | Red | Orange | Yellow | Green | Aqua | Blue | Purple | Magenta |
| Un | Re | - | + | | | | | | | | | | | | |

FIG. 8C

Table 2: The operation assignment for two independent touchbands

| Touchband | Operation Name | Gesture Assignment | Operation Function |
|---|---|---|---|
| 1 | Menu-on/off | One-finger long press | Toggle menu_Display value |
| | Menu-down | One-finger mini-down-drag | Move the hightlight down to submenu layer |
| | Menu-up | One-finger mini-up-drag | Move the highlight to parent menu item |
| | Menu-right | One-finger tap | Move the highlight to the adjacent menu item on the right |
| | Menu-left | One-finger double tap | Move the highlight to the adjacent menu item on the left |
| | Menu-drag | One-finger horizontal drag | Drag the highlight in the active menulayer |
| | 1st control-drag | Two-finger horizontal drag | Change 1st drag-control function value |
| | 2nd control-drag | Three-finger horizontal drag | Change 2nd drag-control function value |
| | 1st command-tap | Two-finger tap | Trigger the 1st tap command |
| | 2nd command-tap | Two-finger double tap | Trigger the 2nd tap command |
| | 3rd command-tap | Three-finger tap | Trigger the 3rd tap command |
| | 4th command-tap | Three-finger double tap | Trigger the 4th tap command |
| 2 | 3rd control-drag | One-finger vertical drag | Change 3rd drag-control function value |
| | 4th control-drag | Two-finger vertical drag | Change 4th drag-control function value |
| | 5th control-drag | Three-finger vertical drag | Change 5th drag-control function value |
| | 5th command-tap | One-finger tap | Trigger the 5th tap command |
| | 6th command-tap | One-finger double tap | Trigger the 6th tap command |
| | 7th command-tap | Two-finger tap | Trigger the 7th tap command |
| | 8th command-tap | Two-finger double tap | Trigger the 8th tap command |
| | 9th command-tap | Three-finger tap | Trigger the 9th tap command |
| | 10th command-tap | Three-finger double tap | Trigger the 10th tap command |

FIG. 9

Table 3: The Operation Assignment for two soft touchbands

| Touchband | Operation Name | Gesture Assignment | Operation Function |
|---|---|---|---|
| 1 and 2 | Touchband-1-set | Three-finger tap | Set touchband index = 1 |
| | Touchband-2-set | Three-finger double tap | Set touchband index = 2 |
| 1 | Menu-on/off | One-finger long press | Toggle menu_Display value |
| | Menu-down | One-finger mini-down-drag | Move the hightlight down to submenu layer |
| | Menu-up | One-finger mini-up-drag | Move the highlight to parent menu item |
| | Menu-right | One-finger tap | Move the highlight to the adjacent menu item on the right |
| | Menu-left | One-finger double tap | Move the highlight to the adjacent menu item on the left |
| | Menu-drag | One-finger horizontal drag | Drag the highlight in the same layer menu |
| | $1^{st}$ control-drag | Two-finger horizontal drag | Change $1^{st}$ drag-control function value |
| | $2^{nd}$ control-drag | Three-finger horizontal drag | Change $2^{nd}$ drag-control function value |
| | $1^{st}$ command-tap | Two-finger tap | Trigger the $1^{st}$ tap command |
| | $2^{nd}$ command-tap | Two-finger double tap | Trigger the $2^{nd}$ tap command |
| | $3^{rd}$ command-tap | Two-finger long press | Trigger the $3^{rd}$ tap command |
| | $4^{th}$ command-tap | Three-finger long press | Trigger the $4^{th}$ tap command |
| 2 | $3^{rd}$ control-drag | One-finger horizontal drag | Change $3^{rd}$ drag-control function value |
| | $4^{th}$ control-drag | Two-finger horizontal drag | Change $4^{th}$ drag-control function value |
| | $6^{th}$ control-drag | Three-finger horizontal drag | Change $5^{th}$ drag-control function value |
| | $5^{th}$ command-tap | One-finger tap | Trigger the $5^{th}$ tap command |
| | $6^{th}$ command-tap | One-finger double tap | Trigger the $6^{th}$ tap command |
| | $7^{th}$ command-tap | Two-finger tap | Trigger the $7^{th}$ tap command |
| | $8^{th}$ command-tap | Two-finger double tap | Trigger the $8^{th}$ tap command |
| | $9^{th}$ command-tap | Two-finger long press | Trigger the $9^{th}$ tap command |
| | $10^{th}$ command-tap | Three-finger long press | Trigger the $10^{th}$ tap command |

FIG. 10

Table 4: The Operation Assignment for the laptop original touchpad in context-dependent touchband mode

| Touchband Operation | Gesture Assignment | Operation Function |
| --- | --- | --- |
| Menu-down | One-finger tap | Move the hightlight down to the submenu layer |
| Menu-up | One-finger double tap | Move the highlight to the parent menu item |
| Menu-drag | One-finger horizontal drag | Drag the highlight in the active menulayer |
| $1^{st}$ control-drag | Two-finger horizontal drag | Change $1^{st}$ drag-control function value |
| $2^{nd}$ control-drag | Three-finger horizontal drag | Change $2^{nd}$ drag-control function value |
| $3^{rd}$ control-drag | One-finger vertical drag | Change $3^{rd}$ drag-control function value |
| $4^{th}$ control-drag | Two-finger vertical drag | Change $4^{th}$ drag-control function value |
| $5^{th}$ control-drag | Three-finger vertical drag | Change $5^{th}$ drag-control function value |
| $1^{st}$ command-tap | Two-finger tap | Trigger the $1^{st}$ tap command |
| $2^{nd}$ command-tap | Two-finger double tap | Trigger the $2^{nd}$ tap command |
| $3^{rd}$ command-tap | Three-finger tap | Trigger the $3^{rd}$ tap command |
| $4^{th}$ command-tap | Three-finger double tap | Trigger the $4^{th}$ tap command |
| $5^{th}$ command-tap | One-finger long press | Trigger the $5^{th}$ tap command |
| $6^{th}$ command-tap | Two-finger long press | Trigger the $6^{th}$ tap command |
| $7^{th}$ command-tap | Three-finger long press | Trigger the $7^{th}$ tap command |

| 118 | 119 | | 120 | | 121 | | |
|---|---|---|---|---|---|---|---|
| System | White Balance | Tone | Presence | Tone Curve | Color | Sharpening | Noise Reduction | Camera Calibration |
| Page | | Vertical | Zoom | Home/End | | Undo/Redo | | Rotate | Volume | Bright |
| Back | For | Scroll | | Home | End | Undo | Redo | | | |

| | | 123 | | 124 | | 125 | 126 | | |
|---|---|---|---|---|---|---|---|---|---|
| System | White Balance | Tone | Presence | Tone Curve | Color | Sharpening | Noise Reduction | Camera Calibration |
| Undo/Redo | | Hue +2 | | Saturation +4 | Luminance -2 | Red/ Orange | Yellow/ Green | Agua/ Blue | Purple/ Magenta |
| Undo | Redo | - | + | | | | | | |

| | 128 | 129 | | | 130 | | 131 | |
|---|---|---|---|---|---|---|---|---|
| Red/ Orange | Yellow/ Green | Agua/ Blue | Purple/ Magenta | | | | | |
| Undo/Redo | Y: Hue -1 | Saturation | Luminance | G: Hue +1 | | Saturation | Luminance |
| Undo | Redo | | Y: +10 | Y: -5 | - | + | G: +12 | G: -9 |

FIG. 13C

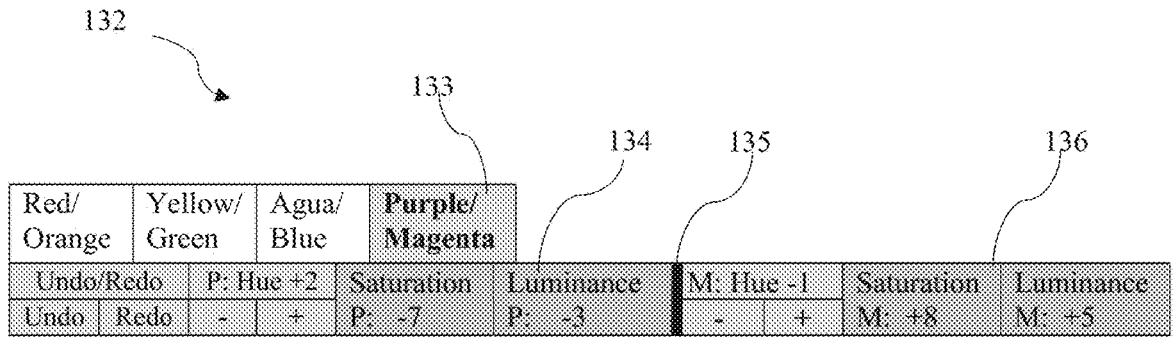

FIG. 13D

Table 5   Applications that the content-dependent touchband supports

| Index | Application Category | Application Tools |
|---|---|---|
| 1 | Office Document Editing | MS Word<br>MS OneNote<br>MS Excel<br>MS PowerPoint<br>MS Visio |
| 1 | Photo Editing | Adobe Photoshop<br>Adobe Lightroom<br>Apple Photos (for macOS)<br>Corel PaintShop Pro<br>CorelDRAW |
| 2 | Video Editing | Adobe Premiere Pro<br>Apple Final Cut Pro X<br>Corel VideoStudio Ultimate<br>Sony Catalyst Production Suite |
| 3 | Audio Editing | Adobe Audition<br>Apple Logic Pro X |
| 4 | CAD Design | AutoCAD<br>TurboCAD |

FIG. 14

CONTEXT-DEPENDENT TOUCHBANDS

BACKGROUND OF THE INVENTION

1. Field of the Invention

The present invention relates to the field of computer systems, more particularly, the present invention relates to computer context-dependent touchbands—narrow multi-touch touchpads on the computer keyboard which support the multi-level context-dependent cascading menu interface and provide the methods to change multiple drag-control functions and trigger multiple tap commands in a single selected menu item.

2. Description of the Related Art

The context-dependent menu interface is immediacy and convenience to the most computer application usage. The menu selection and the control value adjusting are done by a dial based computer input device in a fast, certain and comfortable way.

Two good examples are the Microsoft Surface Dial Device and Logitech Crown Dial on the Craft keyboard.

Surface Dial is a standalone input device connected with windows through Bluetooth connection. Microsoft has had most of its windows applications to work with Surface Dial. Press and hold Surface Dial triggers displaying a radial menu which is the context-dependent with the active windows application. This makes the function menu selection easier and without touching the keyboard and mouse. Rotating the dial can select the target menu. Clicking the dial to confirm the selection. After that the control value of the selected menu is changed when rotating the dial—increasing the value for clockwise rotation and decreasing the value for anticlockwise rotation.

Craft Crown Dial is a touch-sensitive input dial on the Logitech keyboard Craft—a flagship keyboard of Logitech. With a slight touch of the Crown Dial, user can instantly access context-dependent functions. Each slight touch of the Crown Dial, the active menu item moves to the next with one direction cycle scheduling. With the Logitech Options Software, Crown Dial can maximize the creative process when working with Adobe Photoshop editing, Adobe Premier Pro video editing and Microsoft Office tools. Crown Dial brings comfort, immediacy and convenience to the usage.

Through careful analysis of the above two applications, it can be found that each of them has certain drawbacks—only one tap operation and one dial operation could be used for the menu interface, it makes manipulation of the context-dependent menu less convenient.

For Surface Dial, when a menu is selected after rotating the dial, a tap operation is needed to convert the dial to the control mode. When finishing adjusting the control function, a tap operation is needed for changing from control mode to menu mode. If a submenu function is selected, many operations are required to return back to the parent menu item. More importantly for one selected menu item, only one control function can be driven or changed. If users want to zoom and rotate a target on the display, a lot of menu operations are required when swap these two functions.

For Crown Dial, light touch the dial is dedicated to one-directional moving highlight one-by-one and rotating the dial is dedicated to changing the drag-control function value. It cannot handle the multi-level context-dependent menu interface. This limits the flexibility of the device. Also, the highlight can only be moved one by one in one direction cycle scheduling. It can cause users to feel uncomfortable as the number of menu items increases.

Apple introduced new touch bar on its MacBook Pro laptop. A touch bar is a touch sensitive row of soft keys, media keys and/or other controls above, below or in-place-of a row of physical function keys. The row of the keys and controls are often indicated through lights, with different colors and/or under different symbols or a full-fledged touch screen. Optimally, all the keys are context-dependent, changing not just appearance but size based on what app the user is in and what the user is doing. Apple touch bar is very powerful and easy to use.

Because the Apple touch bar and the screen are separated each other, when switching to the touch bar, the users must move their eyesight to the touch bar, check available keys and control tools, and carefully position their fingers on the icon of the control key or control slider to be used. This shift of sight could affect the user's attention to the object on the display screen and cause the user's visual fatigue.

SUMMARY OF THE INVENTION

The present invention provides a system and method that uses one or more touchbands, narrow multi-touch touchpads—on the computer keyboard to support the multi-level context-dependent cascading menu interface. The menu operations specified on the touchbands move the highlight and selecting the menu item. Every menu item can include a plurality of drag-control functions driven by the independent control-drag operations and a plurality of tap commands triggered by the independent command-tap operations. It is unnecessary for users to shift their eyesight from the screen to the touchbands when they operate on the context-dependent touchbands. More importantly, the context-dependent touchbands provide users with a dynamic control panel with multiple control buttons and control sliders.

In one embodiment of the present invention, two independent horizontal touchbands are disposed at the top area of the keyboard. The context-dependent menu is displayed on the computer screen. The computer touchband device application program manages a multi-level context-dependent cascading menu interface. The context-dependent menu has two-layer menu format wherein the active menu layer is on top and the content of the highlighted menu item is under the active menu layer. Five menu-tap operations (a menu-on/off operation; a menu-down operation; a menu-up operation; a menu-right operation; a menu-left operation) and one menu-drag operation are specified from the gestures on the touchband 1. In addition, two control-drag operations (with index 1, 2) and four command-tap operations (with index from 1 to 4) are specified from the gestures on the touchband 1. Three control-drag operations (with index from 3 to 5) and six command-tap operations (with index from 5 to 10) are specified from the gesture on the touchband 2. The menu operations defined in the touchband 1 are used to move the highlight in the menu structure. After selecting a menu item, the control-drag operation with index k changes the value of the k-th drag-control function listed for the highlighted menu item; The command-tap operation with index m triggers execution of the m-th tap command listed for the highlighted menu item.

In another embodiment of the present invention, one horizontal context-dependent touchband is disposed at the top arear of the computer keyboard. Two soft touchbands share this physical touchband. To share one physical touchband, two global touchband-set operations are specified to select the active soft touchband: three-finger tap gesture on the touchband for touchband-1-set operation which sets the soft touchband 1 to active; three-finger double tap gesture on the touchband for touchband-2-set operation which sets the soft touchband 2 to active. These two global touchband-set operations separate two soft touchbands. The context-dependent touchband operation assignment for two soft touchbands is similar to the two independent touchbands except that two global touchband-set operation are added and four command-tap operations are missing: Five menu-tap operations and one menu-drag operation are specified from the gestures on the soft touchbands 1. Two control-drag operations (with index 1 and 2) and four command-tap operations (with index from 1 to 4) are specified from the gestures on the touchband 1. For the soft touchband 2, three control-drag operations (with index from 3 to 5) and six command-tap operations (with index from 5 to 10) are specified from the gestures on the soft touchband 2. When the soft touchband 1 is active, all the menu operations are active and can be used to move the highlight in the context-dependent menu structure. After selecting a menu item, the first four tap commands operations and the first two control-drag operations can be instantly used. If the drag-control functions or tap commands defined for the soft touchband 2 need to be executed, the touchband-2-set operation sets the soft touchband 2 to active. Then the control-drag operations and the command-tap operations defined on the soft touchband 2 can be used for the operation functions. The displayed context-dependent menu uses specific background color or sign to indicate the active soft touchband. It helps the users to identify the active soft touchband and use the operations correctly.

In another embodiment of the present invention, the context-dependent touchband is original touchpad on the laptop keyboard. A touchpad mode switch key said Tcb is set at left side of the touchpad. The touchpad mode switch key Tcb is used to toggle the touchpad mode between the original mode and the context-dependent mode. A mode indicating light is set under the switch key Tcb. The light is on during the context-dependent mode and indicates that all the defined gestures on the touchpad can be used for the context-dependent menu interface. The main drag gestures for the context-dependent touchband includes all vertical drag gesture and all horizontal drag gestures. Three menu-tap operations (a menu-on/off operation, a menu-down operation and a menu-up operation) and one menu-drag operation are specified from the tap gesture on the touchpad. Five control-drag operations and seven command-tap operations are also specified from the gesture on the touchpad. After selecting a menu item, the control-drag operation with index k changes the value of the k-th drag-control function listed for the highlighted menu item. The command-tap operation with index m triggers execution of the m-th tap command listed for the highlighted menu item.

The present invention provides a system and method for the computer context-dependent menu interface which uses multiple easy menu operation to manipulate the menu selection and multiple control-drag operation to change multiple drag-control functions in a selected menu item. During all the operations, users can keep their focus on the displayed working target without shifting their eye sight on to the touchband.

For every selected menu item, users can change multiple drag-control function value and can trigger multiple tap commands without switching the menu item. The touchbands on the keyboard works as a multi-functional control panel which has a plurality of control buttons and a plurality of control sliders on the panel.

Because the context-dependent touchband is disposed on the computer keyboard, they form a powerful seamless docking with each other which supports users to finish their various jobs with easier operation and productive process.

BRIEF DESCRIPTION OF THE DRAWINGS

FIG. 6 is an operation assignment table for a single touchband of the touchband with three control-drag operations.

FIG. 8A is the example of the horizontal context-dependent menu user interface for a photo editing software.

FIG. 8B is the menu structure of the menu item "Zoom/Rotate" which is a submenu item of the "System" shown in FIG. 8A.

FIG. 8C is the displayed menu structure when the highlight is in the top menu item "Color".

FIG. 9 is an operation assignment table for two independent touchbands.

FIG. 10 is an operation assignment table for two soft touchbands which share a physical touchband.

FIG. 11 is an operation assignment table for the laptop original touchpad in context-dependent mode.

FIG. 13A is the example of the horizontal context-dependent menu user interface for a photo editing software.

FIG. 13B is the menu structure when the highlight is in the top menu item "Color".

FIG. 13C is the submenu structure of the menu item "Yellow/Green".

FIG. 13D is the submenu structure of the menu item "Purple/Magenta".

FIG. 14 shows the applications that the context-dependent touchband can support.

DETAILED DESCRIPTION OF THE INVENTION

Some embodiments of the present invention will be described below. In an effort to provide a concise description of these embodiments, not all features of an actual implementation are described in the specification.

Figure 1:
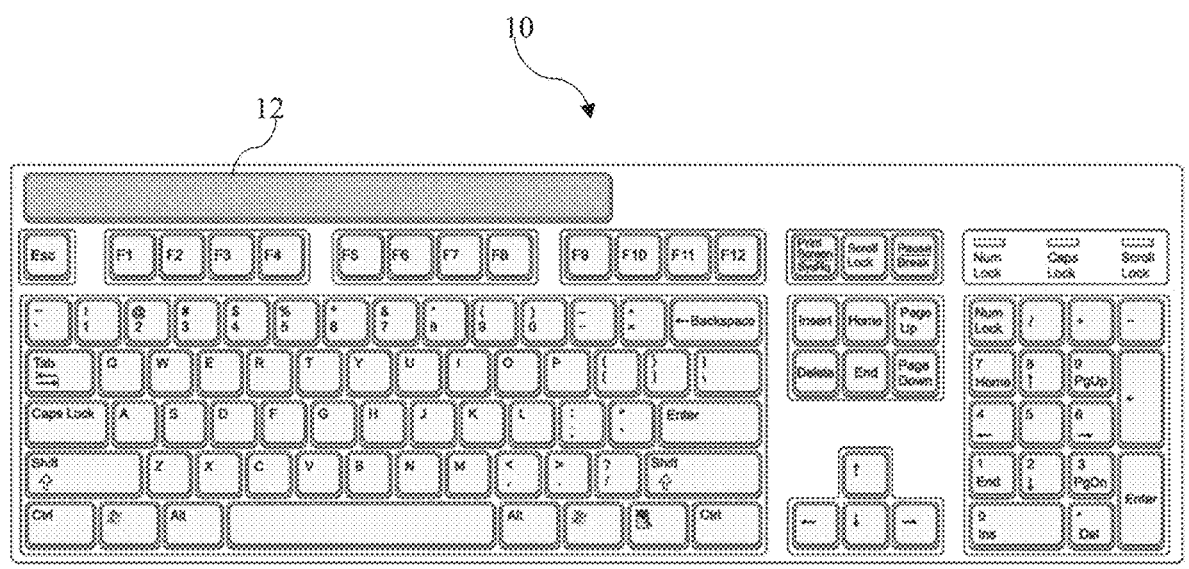
FIG. 1 is a top view of a computer keyboard with a single horizontal touchband in the top area.

Referring to FIG. 1, a computer keyboard 10 includes one horizontal touchband 12 in the top area of the keyboard. Assuming touchband supports up to 3-finger drag gesture. The main drag gestures are horizontal drag gestures which are same as the touchband long side direction. Table 1 shown in FIG. 6 can be used for the operation assignment for this touchband. In Table 1, five menu-tap operations are specified from tap gestures on the touchband: The menu on/off operation is specified as one-finger long press gesture. The menu-down operation is specified as one-finger mini-down-drag gesture. The menu-up operation is specified as one-finger mini-up-drag gesture. The menu-right operation is specified as one-finger tap gesture. The menu-left operation is specified as one-finger tap gesture. Three horizontal drag gestures on the touchband are specified as three control-drag operations with index from 1 to 3. Six tap gestures are specified as six command-tap operations with index from 1 to 6.

Figure 7A:
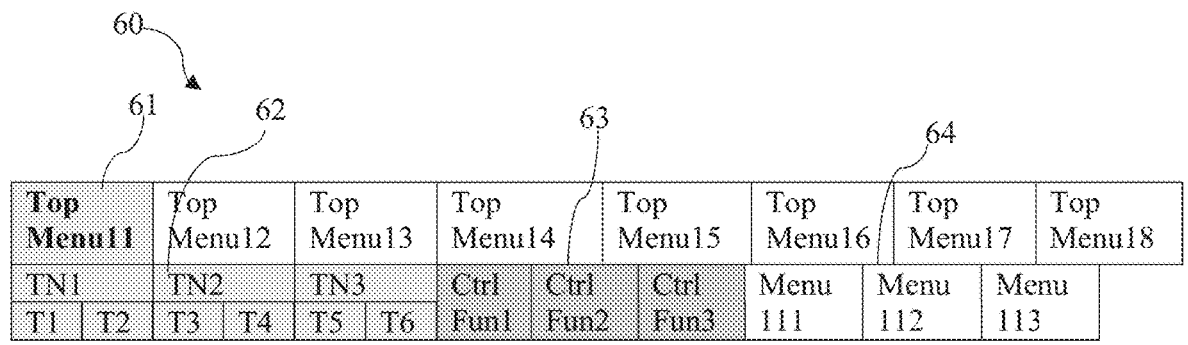
FIG. 7A is the top menu format of the horizontal context-dependent menu structure with the operation assignment shown in FIG. 6.
Figure 7B:
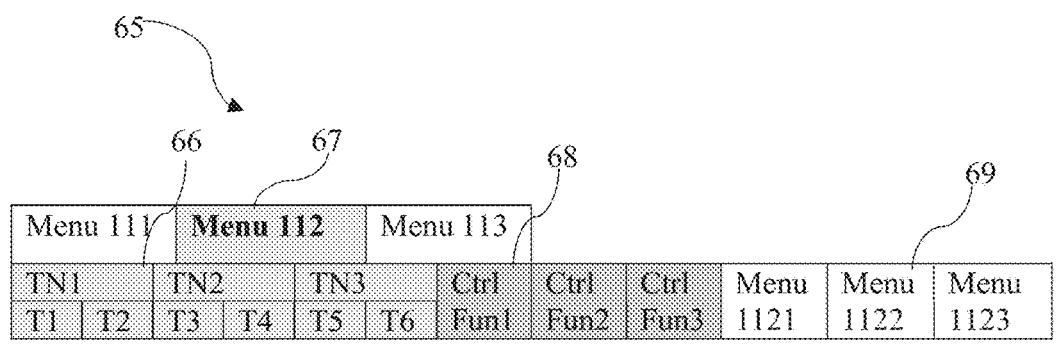
FIG. 7B is the submenu format of the menu item "Menu Item 112" shown in FIG. 7A.
Figure 7C:
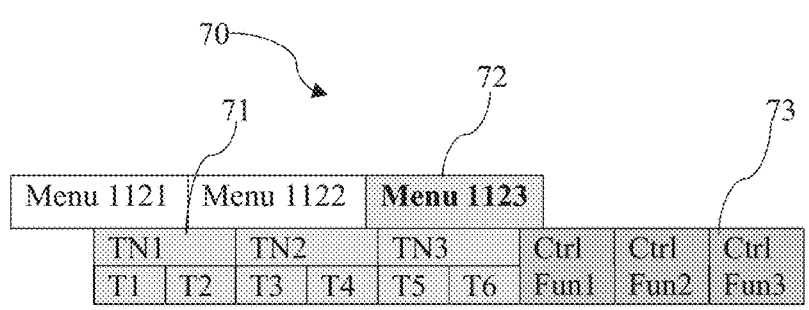
FIG. 7C is the bottom menu format of the menu item "Menu Item 1123" shown in FIG. 7B.

With three control-drag operations and six command-tap operations, every menu item in the context-dependent menu structure could have up to three drag-control functions, up to six tap commands and a plurality of submenu items. The general top menu format of the context-dependent menu structure is shown in FIG. 7A wherein the active menu layer includes 8 menu items, the highlight is in the first menu item "Top Menu11" by default. The highlighted menu item contains six tap commands ("T1", "T2", "T3", "T4", "T5" and "T6"), three drag-control functions ("Ctrl Fun1", "Ctrl Fun2" and "Ctrl Fun3") and a submenu layer structure 64. FIG. 7B shows the submenu layer structure when the highlight is moved to the menu item "Menu 112". FIG. 7C shows the highlighted bottom menu item "Menu 1123" which includes six tap commands and three drag-control functions.

The menu-on/off operation toggles the control variable menu_Display between on and off. Device application program displays the context-dependent menu when menu_Display=on and hide the menu when the variable menu_Display change from on to off.

The menu-right operation moves the highlight to the adjacent menu item on the right in the active menu layer. If the current highlighted item is the last item in a menu layer, then the highlight is moved to the first menu item in a loop.

The menu-left operation moves the highlight to the adjacent menu item on the left in the active menu layer. If the current highlighted item is the first item in a menu layer, then the highlight is moved to the last menu item in a loop.

If the current highlighted menu item contains a submenu structure, the menu-down operation (one-finger mini-down-drag gesture) moves the highlight to the first item of the submenu. If the current highlighted menu item does not have a submenu structure, the menu-down operation is ignored.

Based on the methods presented in this invention, a plurality of soft touchbands can share a physical touchband by using a set of global touchband-set operations to switch dynamically among the soft touchbands. Table 3 shown in FIG. 10 is the operation assignment table for two soft touchbands sharing one physical touchband. To share one physical touchband, two global touchband-set operations are specified in Table 3:

(1) touchband-1-set operation is specified as three-finger tap gesture used to set the touchband index=1 and select the soft touchband 1.

(2) touchband-2-set operation is specified as three-finger double tap gesture used to set the touchband index=2 and select the soft touchband 2.

These two global touchband-set operations separate two soft touchbands. They are active all the time. When one soft touchband is active, another is idle. Only the operations specified on the active soft touchband work.

Six menu operations are defined on soft touchband 1: (1) menu-on/off operation; (2) menu-down operation and (3) menu-up operation; (4) menu-right operation, (5) menu-left operation and (6) menu-drag operation. Four command-tap operations are specified from the tap gesture on the soft touchband 1 (two-finger tap gesture, two-finger double tap gesture, two-finger long press gesture, three-finger long press gesture) and two control-drag operations are specified from main drag gestures (two-finger main drag gesture and three-finger main drag gesture).

For the soft touchband 2, six command-tap operations with index from 5 to 10 are specified from the tap gesture on the soft touchband 2 (one-finger tap, one-finger double tap, two-finger tap, two-finger double tap, two-finger long press gesture, three-finger long press gesture) and three control-drag operations with index from 3 to 5 are specified from three main drag gestures.

When the soft touchband 1 is active, all the menu operations are active and can be used to move the highlight in the context-dependent menu structure. After selecting a menu item, the first two tap commands operations and the first four control-drag operations can be instantly used. If other drag-control functions or tap commands defined for the operations on the soft touchband 2 need to be executed, the touchband-2-set operation sets the soft touchband 2 to be active. After that, the operations defined on the soft touchband 2 can be used for the operation functions. The displayed context-dependent menu uses specific background color or sign for the tap commands and drag-control functions defined on the active soft touchband. It helps the users to identify the active soft touchband and use the operations correctly.

Comparing Table 1 for single touchband with Table 3 for two shared soft touchbands, more command-tap operations and control-drag operations have been added when using the soft touchbands.

Figure 2:
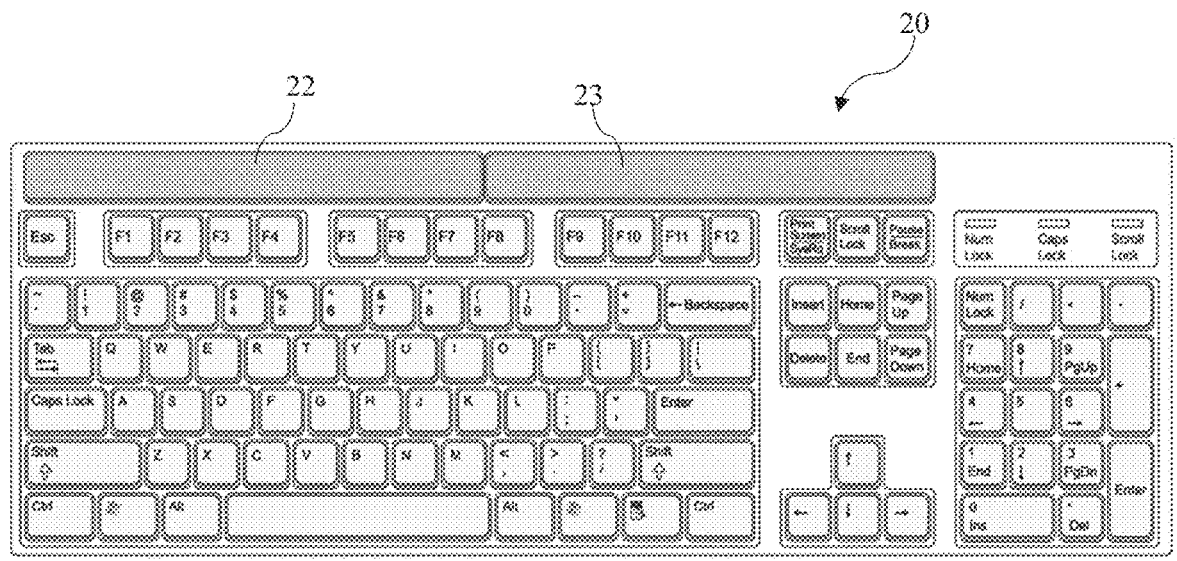
FIG. 2 is a top view of a computer keyboard with two independent horizontal touchbands in the top area.

FIG. 2 shows a computer keyboard 20 includes two independent horizontal touchbands (22, and 23) in the top area of the keyboard. Assuming both touchbands support 3-finger drag gesture. The main drag gestures are horizontal drag gestures which are same as the touchband long side direction: one-finger horizontal drag gesture, two-finger horizontal drag gesture, three-finger horizontal drag gesture. Table 2 shown in FIG. 9 can be used for the operation assignment for these two independent touchbands.

In Table 2, five menu-tap operations and one menu-drag operation are specified from tap gestures on touchband 1: menu on/off operation; menu-down operation; menu-up operation; menu-right operation; menu-left operation; menu-drag operation (one-finger horizontal drag gesture).

Two-finger and three-finger horizontal drag gestures on the touchband 1 are specified as two control-drag operations with index 1 and 2.

Four tap gestures on the touchband 1 are specified as four command-tap operations with index from 1 to 4.

For the touchband 2, six tap gestures are specified as six command-tap operations with index from 5 to 10. Three horizontal drag gestures on the touchband 2 are specified as three control-drag operations with index from 3 to 5.

With five independent control-drag operations and ten independent command-tap operations, every menu item in the context-dependent menu structure could have up to five drag-control functions and up to ten tap commands as well as a plurality of submenu items.

Figure 12A:
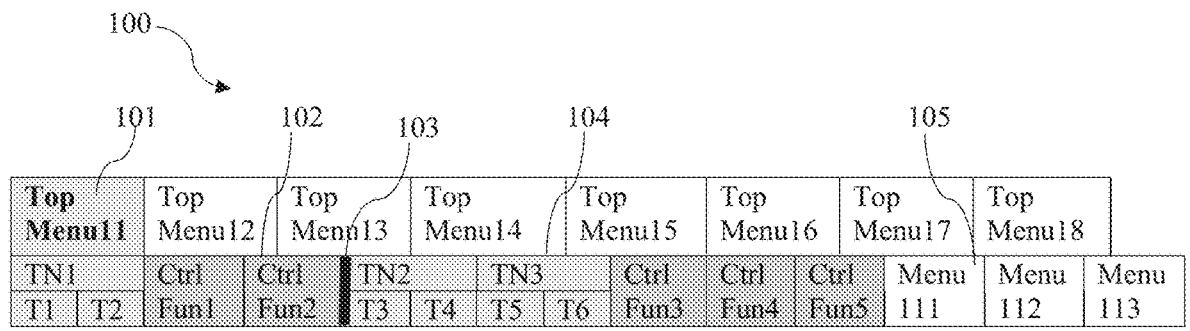
FIG. 12A is the top menu format of the context-dependent menu structure for two touchbands

The diagram 100 shown in FIG. 12A is the general top menu format of the context-dependent menu structure used for the horizontal touchband operation assignment shown in FIG. 9. It has two-layer menu format wherein the active menu layer with one highlighted menu item is on the top and the content of the highlighted menu item is under the active menu layer. In diagram 100, the active menu layer includes 8 menu items. The highlighted menu item 101 ("Top Menu11") contains six tap commands ("T1", "T2", "T3", "T4", "T5" and "T6"), five drag-control functions ("Ctrl Fun1", "Ctrl Fun2", "Ctrl Fun3", "Ctrl Fun4" and "Ctrl Fun5") and a submenu layer structure 105. The tap commands and drag-control functions are divided into two groups (102 and 104) by the touchband index. The marker 103 is the separator. The first group 102 includes two tap commands ("T1" and "T2") and two control-drag operations ("Ctrl Fun1" and "Ctrl Fun2"). The second group 104 includes four tap commands ("T3", "T4", "T5" and "T6") and four control-drag operations ("Ctrl Fun3", "Ctrl Fun4" and "Ctrl Fun5").

Figure 12B:
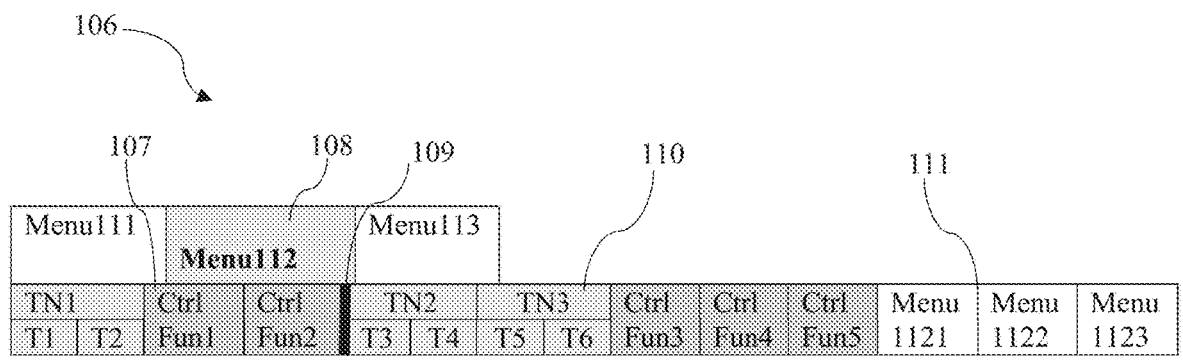
FIG. 12B is the menu format of the submenu item "Menu 112" shown in FIG. 12A.
Figure 12C:
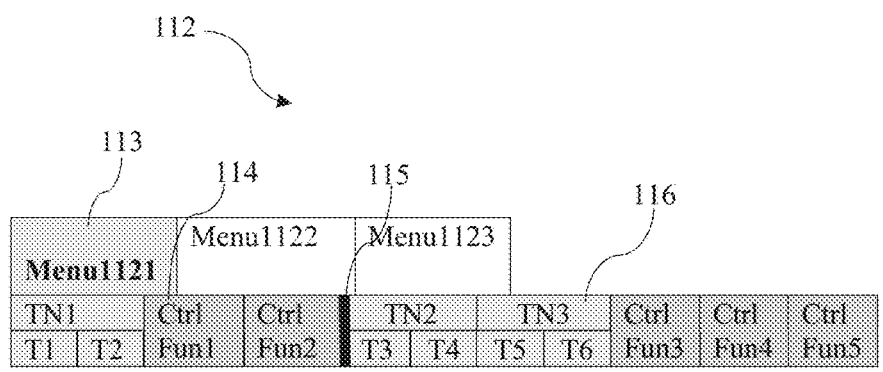
FIG. 12C is the menu format of the bottom menu item "Menu 1121" shown in FIG. 12B.

The diagram 106 in FIG. 12B shows the submenu layer structure when the highlight is moved to the menu item 108 ("Menu 112"). The diagram 112 in FIG. 12C shows the bottom menu item 113 ("Menu 1121") which is highlighted and has two groups of controls (114 and 116) divided by the separator 115. The group 114 has two tap commands ("T1" and "T2") and two drag-control functions ("Ctrl Fun1" and "Ctrl Fun2") driven by the operations defined on the touchband 1. The group 116 has four tap commands ("T3", "T4", "T5" and "T6") and three drag-control functions ("Ctrl Fun3", "Ctrl Func4" and "Ctrl Fun5") driven by the operations defined on the touchband 2.

With menu-right operation or menu-left operation, the highlight can be easily moved to other menu items in the active menu layer for adjusting.

With one menu-up operation, the highlight is moved to the parent menu item "Top Menu11" in the top menu layer.

With one menu-down operation, the highlight is moved to the first submenu item "Menu1121" in the submenu layer.

Figure 3:
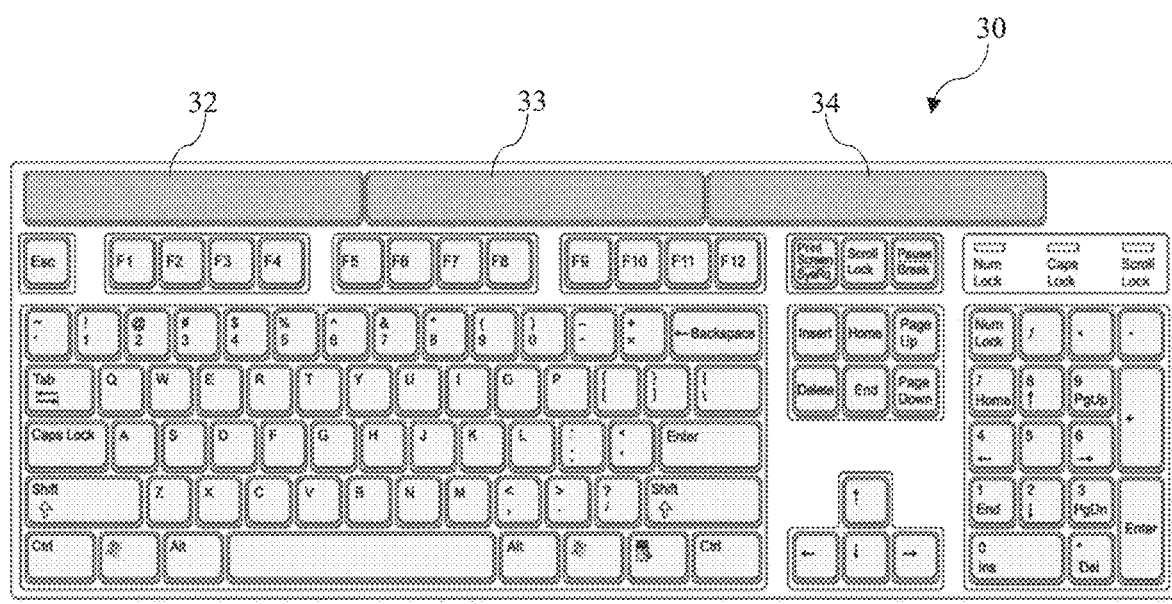
FIG. 3 is a top view of a computer keyboard with three independent horizontal touchbands in the top area.

FIG. 3 shows a computer keyboard 30 includes three independent horizontal touchbands (32, 33, and 34) with index from 1 to 3 in the top area of the keyboard. The operation assignment for the context-dependent menu interface is similar as Table 2:

Five menu-tap operations and one menu-drag operation are specified from tap gestures on touchband 1: (1) menu on/off operation; (2) menu-down operation; (3) menu-up operation; (4) menu-right operation and (5) menu-left operation. In addition, two control-drag operations and four command-tap operations are specified from the gestures on the touchband 1.

For the touchband 2, six tap gestures are specified as six command-tap operations with index from 5 to 10. Three horizontal drag gestures on the touchband 2 are specified as three control-drag operations with index from 3 to 5.

For the touchband 3, six tap gestures are specified as six command-tap operations with index from 11 to 16. Three horizontal drag gestures on the touchband 2 are specified as three control-drag operations with index from 6 to 8.

For the application with three independent touchbands on the keyboard, eight control-drag operations and sixteen command-tap operations are specified. So, every menu item in the context-dependent menu structure could have up to eight drag-control functions, up to sixteen tap commands and a plurality of submenu items. The sixteen tap commands and eight drag-control functions are divided into three groups: the first group includes the commands and functions which are driven by the operations on the touchband 1. the second group includes the commands and functions which are driven by the operations on the touchband 2. the third group includes the commands and functions which are driven by the operations on the touchband 3.

Figure 4:
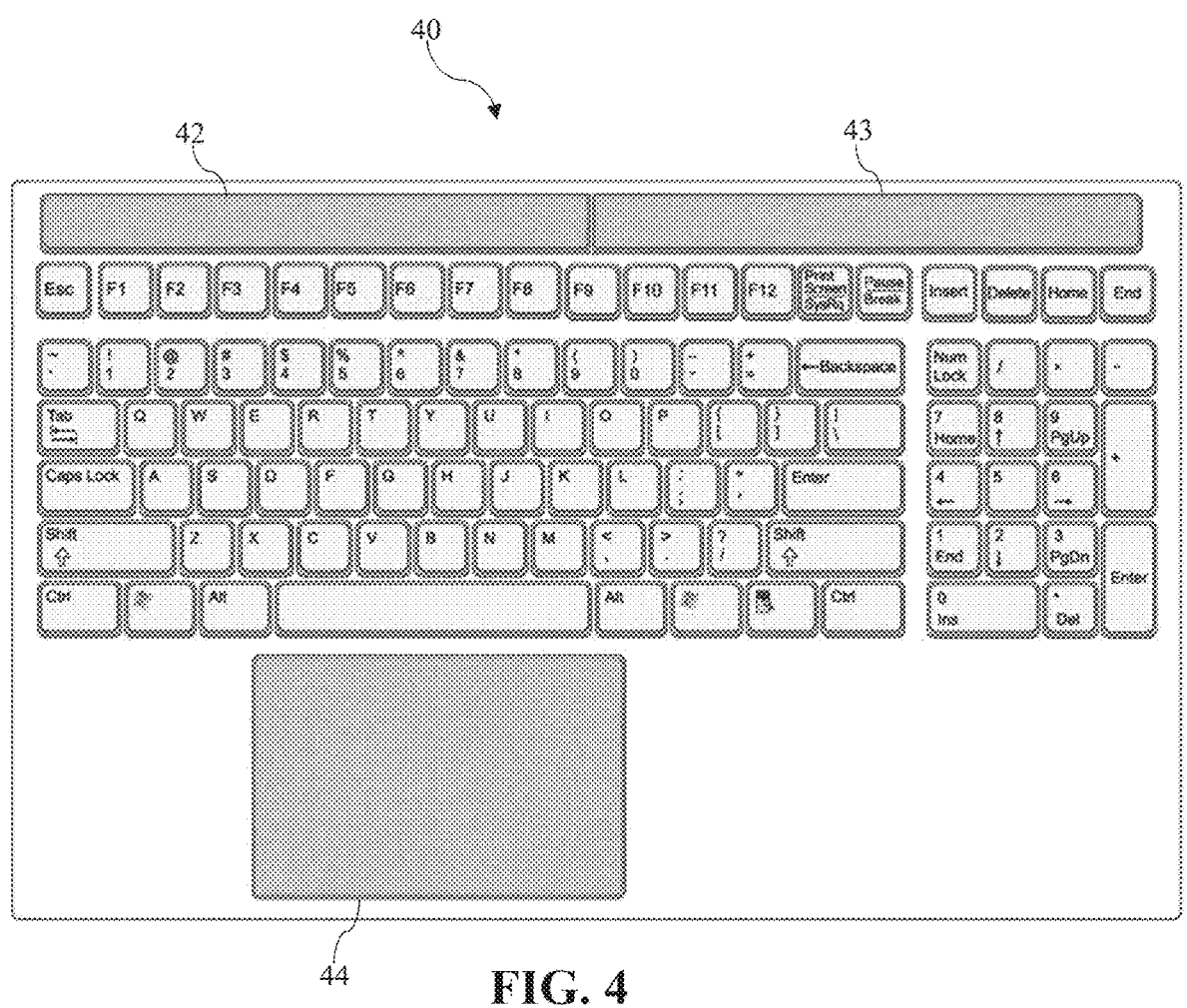
FIG. 4 is a top view of a laptop keyboard with two independent horizontal touchbands in the top area.

FIG. 4 is a laptop keyboard 40 which includes two horizontal touchbands (42 and 43) in the top area of the laptop keyboard. The function and manipulation of the context-dependent touchbands can be totally same as those on two touchbands on the computer keyboard shown in FIG. 2.

The operation assignments are shown in Table 2. Five menu-tap operations, one menu-drag operation, two control-drag operations and four command-tap operations are specified from the gestures on the touchband 1. Three control-drag operations and six command-tap operations are specified from the gestures on the touchband 2.

All the menu operations on the touchband 1 can be used to move the highlight in the context-dependent menu structure. After selecting a menu item, all ten tap commands operations and five control-drag operations can be instantly used without any menu switching.

Figure 5:
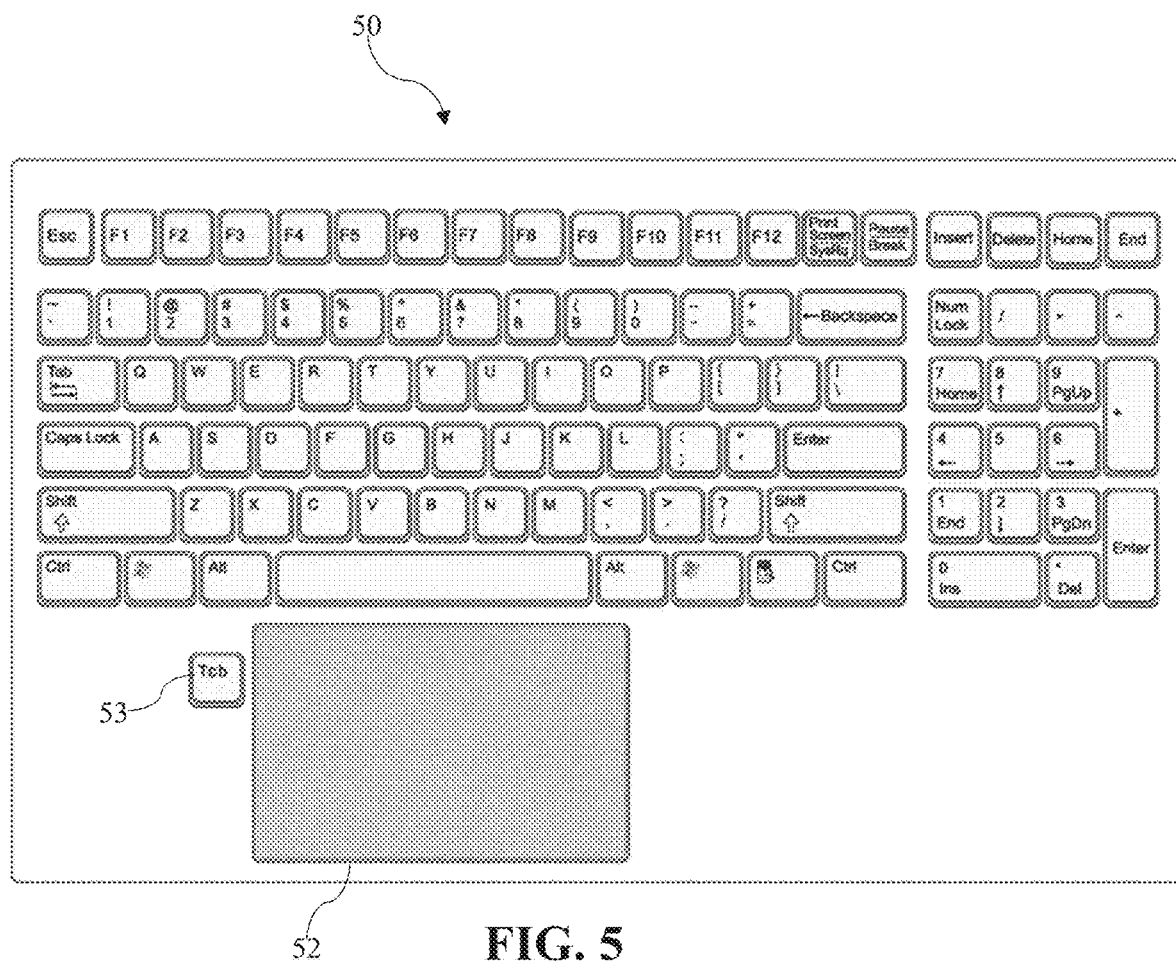
FIG. 5 is a top view of a laptop keyboard with a mode switch key next to the touchpad.

FIG. 5 is the original laptop keyboard 50 which includes an original touchpad 52 and a touchpad mode switch key Tcb 53 at the side of the touchpad. Clicking the touchpad mode switch key Tcb toggles the touchpad mode between the original mode and the context-dependent mode. A mode indicating light is set under the switch key and the light turns on during the context-dependent mode.

Touchpad mode can be toggled by other ways such as pressing combination stroke such as Ctrl+Shift+T. Using the touchpad mode switch key for switching is fast, easier and more user friendly.

The variable menu_Display is set to "on" when the touchpad mode is changed from the original mode to the context-dependent mode and is set to off whenever switching from the context-dependent mode to the original mode.

In the context-dependent mode, the main drag gestures include all the vertical drag gestures and all the horizontal drag gestures.

The table 4 shown in FIG. 11 can be used for the context-dependent mode for the laptop touchpad. in Table 4, Three menu operations are specified:

One-finger tap gesture is specified as menu-down operation;

One-finger double tap gesture is specified as menu-up operation;

One-finger horizontal drag gesture is specified as menu-drag operation;

Five drag gestures (two-finger horizontal drag gesture, three-finger horizontal drag gesture, one-finger vertical drag gesture, two-finger vertical drag gesture and three-finger vertical drag gesture) are specified as five control-drag operations with index from 1 to 5.

Seven tap gestures (two-finger tap gesture, two-finger double tap gesture, three-finger tap gesture, three-finger double tap gesture, one-finger long press gesture, two-finger long press gesture and three-finger long press gesture) are specified as seven command-tap operations with index from 1 to 7.

The context-dependent menu format and manipulation could be similar to those for two touchbands on the computer keyboard shown in FIG. 2.

FIG. 6 is an operation assignment table for a single horizontal touchband with three control-drag operations and four command-tap operations defined.

For a horizontal touchband, the main drag gestures are horizontal drag gestures. The mini drag gestures are vertical short drag gestures.

When the context-dependent menu is horizontal format like that shown in FIGS. 7A~8E, the menu-down operation is specified as one-finger mini-down-drag gesture and the menu-up operation is specified as one-finger mini-up-drag gesture for easy remembering and using.

The menu-right and menu-left operations are the operations that move the highlight in the active menu layer.

Five menu-tap operations are specified from tap gestures on the touchband:

One-finger mini-down-drag gesture is specified as menu-down operation used to move the highlight down to the submenu layer;

One-finger mini-up-drag tap gesture is specified as menu-up operation used to move the highlight back to its parent menu item in the upper menu layer;

One-finger tap gesture is specified as menu-right operation used to move the highlight to the adjacent menu item on the right in the active menu layer;

One-finger double tap gesture is specified as menu-left operation used to move the highlight to the adjacent menu item on the left in the active menu layer;

One-finger long press gesture is specified as menu-on/off operation used to toggle the control variable menu_Display between on and off;

Three horizontal drag gestures are specified as three control-drag operations with index from 1 to 3. The control-drag operation with index k changes the value of the k-th drag-control function listed for the highlighted menu item.

Six tap gestures (two-finger tap gesture, two-finger double tap gesture, three-finger tap gesture, three-finger double tap gesture, two-finger long press gesture, three-finger long press gesture) are specified as six command-tap operations with index from 1 to 6. The command-tap operation with index m triggers execution of the m-th tap command listed for the highlighted menu item.

For a single touchband application with the operation assignment in Table 1, three control-drag operations and six command-tap operations are specified. So, every menu item in the context-dependent menu structure could have up to three drag-control functions and up to six tap commands. Each operation function is driven by individual operation. Switching between these operations are fast and easy because all the operations are simple tap and drag gestures on the touchband.

If the long press gestures and two-finger mini-up/down-drag gestures are considered, more command-tap operations can be specified and used.

The context-dependent menu structure format shown in FIGS. 7A to 7C can be used for the touchband with the operation assignment shown in FIG. 6.

FIG. 7A is the top menu diagram 60 of a context-dependent menu interface for a single touchband on the computer keyboard. Five menu-tap operations, three control-drag operations and six command-tap operations are specified from the operations on the touchband in Table 1. The context-dependent menu interface displays two-layer menu format wherein the first layer is the active menu layer and the second layer is the contents of the highlighted menu item in the active menu layer.

In the FIG. 7A, the top menu layer includes 8 menu items. The highlight is in the first menu item by default. With the menu-right operation, menu-left operation, the highlight can be moved in the active menu layer. For example, with 5 menu-right operations, the highlight is moved to the menu item "Top Menu16". With another menu-right operation, the highlight is moved to the menu item "Top menu17". If the menu item "Top Menu17" is highlighted, with 2 menu-left operations, the highlight is moved to the menu item "Top Menu15".

The menu item 61 ("Top Menu11") contains six tap commands, three drag-control functions and a submenu structure. They are displayed under the active menu layer. Six tap commands and three drag-control functions can be used instantly. The control-drag operation with the index k changes the value of k-th drag-control function. The command-tap operation with the index m triggers the m-th tap command. For example, the third command-tap operation (three-finger tap gesture) triggers the tap command "T3", the second control-drag operation (two-finger drag gesture) changes the value of the second drag-control function "Ctrl Fun2". Then the first control-drag operation (one-finger drag gesture) changes the value of the first drag-control function "Ctrl Fun1".

When the menu item 61 ("Top Menu11") is highlighted, a menu-down operation (one-finger mini-down-drag gesture) moves the highlight down to the first submenu item "Menu 111" in submenu structure.

When the context-dependent menu is displayed on the screen, a menu-on/off operation (one-finger long press gesture) sets the control variable menu_Display to off and hides the context-dependent menu.

When the context-dependent menu has been hided, any specified operation on the touchband sets menu_Display=on and displays context-dependent menu on the screen.

FIG. 7B is the submenu format diagram 65 of the menu item "Menu item 112".

When the top menu item "Top Menu 11" is highlighted, a menu-down operation moves the highlight to the first submenu item "Menu 111". With another menu-right operation, the highlight is moved from menu item "Menu 111" to the menu item "Menu 112". When the menu item "Menu 112" is highlighted, its content is displayed at the second menu layer shown in FIG. 7B.

In diagram 65, There are 4 menu items in the active menu layer. The menu item 67 ("Menu 112") is highlighted in the active menu layer. It includes six tap commands, three drag-control functions and a submenu structure. They are displayed on the second menu layer. Six tap commands ("T1" "T2", "T3", "T4", "T5", "T6") and three drag-control functions ("Ctrl Fun1", "Ctrl Fun2" and "Ctrl Fun3") can be triggered or driven instantly.

After finishing adjusting for the menu item "Menu 112", a menu-up operation moves the highlight back to the parent menu item "Menu 11" shown in FIG. 7A.

FIG. 7C is the bottom menu format of the menu item "Menu Item 1123" shown in FIG. 7B. When the menu item "Menu 112" is highlighted, a menu-down operation moves the highlight to the first submenu item "Menu 1121". With two menu-right operations, the highlight is moved from menu item "Menu 1121" to the menu item "Menu 1123". The menu item "Menu 1123" is a bottom menu item. It does not include any submenu structure.

The menu item "Menu 1123" includes six tap commands and three drag-control functions. They are displayed on the second menu layer. six tap commands ("T1", "T2", "T3", "T4", "T5", "T6") and three drag-control functions ("Ctrl Fun1", "Ctrl Fun2" and "Ctrl Fun3") can be triggered or driven instantly.

After finishing adjusting for the menu item "Menu 1123", the menu-right operation and menu-left operation move the highlight to other menu items in the active menu layer. Or a menu-up operation moves the highlight back to the parent menu item "Menu 112" shown in FIG. 7B.

FIGS. 8A-8E show some diagrams for an example of the context-dependent menu interface for a photo editing application which uses the context-dependent touchband operation assignment shown in FIG. 6.

FIG. 8A is the top menu structure diagram 75 which can be used for a single touchband with the operation assignment shown in FIG. 6. In the diagram 75, The active menu layer includes 9 menu items. The highlight is in the first menu item 76 ("System") by default. With the menu-right operation, menu-left operation, the highlight can be moved in the active menu layer. For example, with 5 menu-right operations, the highlight is moved to the menu item "Color". With a menu-left operation, the highlight is moved from menu item "Color" to the menu item "Tone Curve".

The menu item 76 ("System") contains six tap commands ("Backward Page", "Forward Page", "Undo", "Redo", "Mute", "Pause"), three drag-control functions ("Vertical Scroll", "Horizontal Scroll" and "Volume") and a submenu structure. The submenu structure includes only one menu item "Zoom/Rotate". Four tap commands and three drag-control functions can be used instantly. For example, the first control-drag operation (one-finger horizontal drag gesture) scrolls display vertically; the second control-drag operation (two-finger horizontal drag gesture) scrolls display horizontally; the third control-drag operation (three-finger horizontal drag gesture) changes the system volume; the first command-tap operation (two-finger tap gesture) triggers "Backward Page" command; the second command-tap operation (two-finger double tap gesture) triggers "Forward Page" command; the third command-tap operation (three-finger tap gesture) triggers "Undo" command; the fifth command-tap operation (two-finger long press gesture) triggers "Mute" command for the system volume.

Because the menu item 76 ("System") includes a submenu structure, a menu-down operation (one-finger mini-down-drag gesture) moves the highlight down to the first submenu item "Zoom/Rotate".

When the context-dependent menu is displayed on the screen, a menu-on/off operation (one-finger long press gesture) sets the control variable menu_Display to off and hides the context-dependent menu.

When the context-dependent menu has been hided, any specified operation on the touchband such as a one-finger tap gesture sets menu_Display=on and displays context-dependent menu on the screen.

FIG. 8B is a submenu structure diagram 80 for menu item 81 ("Zoom/Rotate"). When the top menu item 76 ("System") is highlighted, a menu-down operation moves the highlight to the submenu item "Zoom/Rotate". After menu item 81 ("Zoom/Rotate") is highlighted, its content is displayed at the second menu layer shown in FIG. 8.

In the diagram 80, the first layer is the active menu layer which has only one menu item "Zoom/Rotate". The highlighted menu item 81 ("Zoom/Rotate") includes four tap commands and three drag-control functions. They are displayed on the second menu layer. Six tap commands ("Delete", "BackSpace", "Home", "End", "Undo", "Redo") and three drag-control functions ("Zoom", "Rotate" and "Brightness") can be triggered or driven instantly by the corresponding command-tap operations or corresponding control-drag operations.

After finishing adjusting for the menu item "Zoom/Rotate", a menu-up operation (one-finger mini-up-drag gesture) moves the highlight back to the parent menu item 76 ("System") shown in the diagram 75.

FIG. 8C shows the top menu structure diagram 85 when the highlight is moved from the menu item 76 shown in the diagram 75 to the menu item 88 ("Color") in the top menu layer in the diagram 85.

The top menu item 88 ("Color") includes four tap commands 86, two drag-control functions 87 and a submenu structure 89 which has 8 menu items. When the top menu item 88 ("Color") is highlighted, its content is displayed in the second menu layer shown in the diagram 85.

With the menu-right operation and menu-left operation, the highlight can be moved in the active menu layer.

Four tap commands ("Undo", "Redo", "Hue−" and "Hue+") and two drag-control functions ("Saturation" and "Luminance") are used for adjusting for all colors and can be triggered or driven instantly by four command-tap operations and two control-drag operations:

The first command-tap operation triggers "Undo" function.

The second command-tap operation triggers "Redo" function.

The third command-tap operation subtracts 1 from "Hue" of all colors.

The fourth command-tap operation adds 1 to "Hue" of all colors.

The first control-drag operation changes "Saturation" of all colors.

The second control-drag operation changes "Luminance" of all colors.

FIG. 8C shows that "Hue" for all colors has been changed to "+2" by the third command-tap operation; "Saturation" has been changed to "+4" by the first control-drag operation; "Luminance" has been changed to "−2" by the second control-drag operation.

During adjusting for all colors with command-tap operations and control-drag operations, the menu-right operation and menu-left operation move the highlight to other menu items in the top menu layer shown in the diagram 85.

During adjusting for all colors, a menu-down operation moves the highlight first submenu item "Red" in the submenu layer.

Figure 8D:
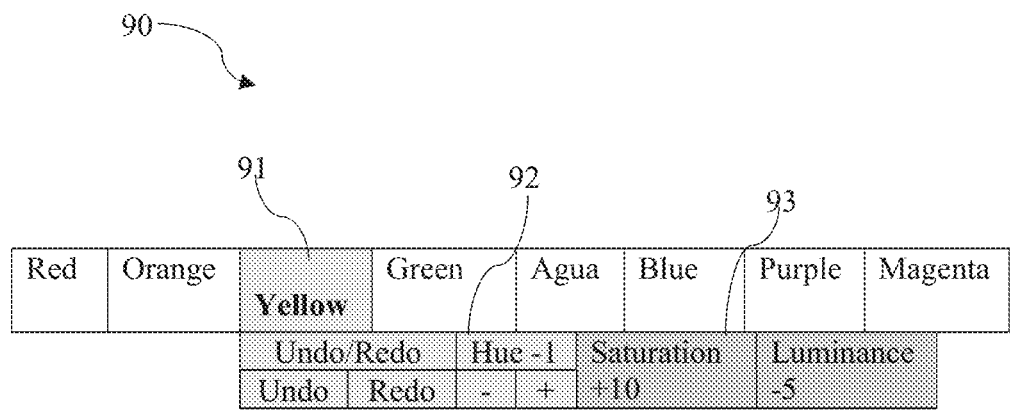
FIG. 8D is the displayed submenu structure of the top menu item "Color" when the highlight is in the third submenu item "Yellow".

FIG. 8D shows the submenu layer structure diagram 90 of the menu item "Yellow". With a menu-down operation, the highlight is moved from the top menu item "Color" to its first submenu item "Red" shown in the diagram 85. with two menu-right operations, the highlight is moved to the third menu item "Yellow". The menu item "Yellow" is a bottom menu item. It does not include any submenu structure. The menu item "Yellow" includes four tap commands and two drag-control functions. They are displayed on the second menu layer shown in the diagram 90. Four tap commands ("Undo", "Redo", "Hue−" and "Hue+") and two drag-control functions ("Saturation" and "Luminance") are used for adjusting for the color "Yellow" and can be triggered or driven instantly by four command-tap operations and two control-drag operations in the same way as that for adjusting all colors.

FIG. 8D shows the result after changing: "Hue" of "Yellow" has been changed to "−1"; "Saturation" of "Yellow" has been changed to "+10"; Luminance" of "Yellow" has been changed to "−5".

After finishing adjusting for the color "Yellow", the menu-right operation and menu-left operation move the highlight to other colors in the active menu layer for adjusting.

A menu-up operation moves the highlight back to the parent menu item "Color" shown in the diagram 85.

Figure 8E:
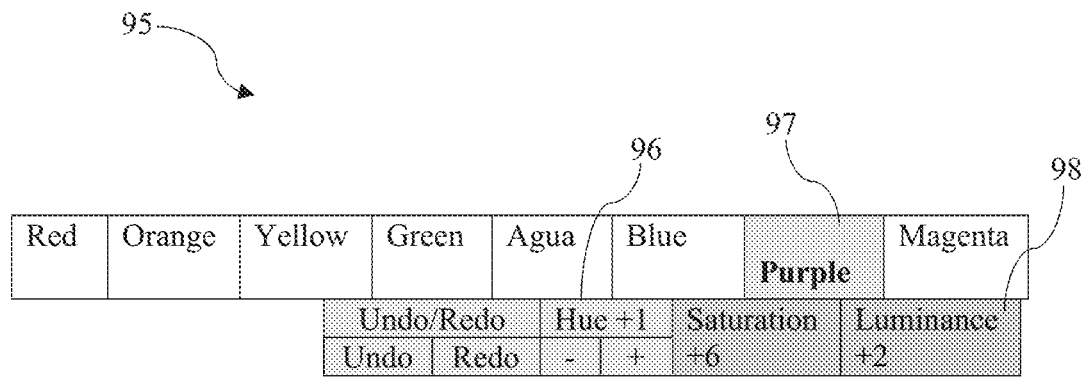
FIG. 8E is the displayed submenu structure of the top menu item "Color" when the highlight is in the seventh submenu item "Purple".

FIG. 8E shows the submenu structure diagram 95 of the menu item 91 ("Purple"). With four menu-right operations, the highlight is moved from the color 91 ("Yellow") shown in the diagram 90 to the menu item 97 ("Purple") shown in the diagram 95. The menu item 97 ("Purple") includes four tap commands and two drag-control functions. They are displayed on the second menu layer. Four tap commands ("Undo", "Redo", "Hue−" and "Hue+") and two drag-control functions ("Saturation" and "Luminance") are used for adjusting for the color "Purple" and can be triggered or driven instantly by four command-tap operations and two control-drag operations in the same way as that for adjusting all colors.

FIG. 8E shows the result after changing: "Hue" of "Purple" has been changed to +1; "Saturation" of "Purple" has been changed to "+6"; Luminance" of "Purple" has been changed to "+2".

After finishing adjusting for the color "Yellow", the menu-right operation and menu-left operation move the highlight to other colors in the active menu layer for adjusting.

A menu-up operation moves the highlight back to the parent menu item 88 ("Color") shown in the diagram 85.

Table 2 shown in FIG. 9 is an embodiment of the operation assignment for two independent horizontal touchbands on the computer keyboard. With two independent touchbands, more independent control-drag operations and command-tap operations can be specified.

For the horizontal touchbands, the main drag gestures are horizontal drag gestures. The mini drag gestures are upward and downward mini-drag gestures.

When the context-dependent menu structure is horizontal format like that shown in FIGS. 12A~12C, the menu-down operation is specified as one-finger mini-down-drag gesture and the menu-up operation is specified as one-finger mini-up-drag gesture for easy remembering and using.

In Table 2, five menu-tap operations and one menu-drag operation are specified on the touchband 1:

One-finger long press gesture is specified as menu-on/off operation;

One-finger mini-down-drag gesture is specified as menu-down operation;

One-finger mini-up-drag gesture is specified as menu-up operation;

One-finger tap gesture is specified as menu-right operation;

One-finger double tap gesture is specified as menu-left operation;

One-finger horizontal drag gesture is specified as menu-drag operation.

For the touchband 1, Two control-drag operations with index 1 and 2 are specified from two-finger and three-finger horizontal drag gestures on the touchband 1; Four command-tap operations with index from 1 to 4 are specified from available tap gestures on the touchband 1 (two-finger tap gesture, two-finger double tap gesture, three-finger tap gesture, three-finger double tap gesture).

For the touchband 2, Three control-drag operations with index from 3 to 5 are specified from three horizontal drag gestures; Six command-tap operations with index from 5 to 10 are specified from following tap gestures on the touchband 2: One-finger tap gesture, one-finger double tap gesture, two-finger tap gesture, two-finger double tap gesture, three-finger tap gesture, three-finger double tap gesture.

For two independent horizontal touchbands, total five control-drag operations and ten command-tap operations are defined. So, every menu item in the context-dependent menu structure could have up to five drag-control functions and up to ten tap commands. Each operation function is driven by an individual operation. Switching between these operations are very easy because they are tap and drag gestures on the touchbands. The users do not need looking at their operation fingers and the touchband.

The control-drag operation with index k changes the value of the k-th drag-control function listed for the highlighted menu item.

The command-tap operation with index m triggers xecution of the m-th tap command listed for the highlighted menu item.

If the long press gestures and two-finger mini-up/down-drag gestures are considered, more command-tap operations can be specified and used.

FIGS. 12A to 12C are the general context-dependent menu structure. They can be used for the touchbands with the operation assignment shown in FIG. 9.

Table 3 shown in FIG. 10 is an embodiment of the operation assignment for two soft touchbands which share one physical horizontal touchband.

Two soft touchbands are assigned with index 1 and 2. To share one physical touchband, two global touchband-set operations are specified to switch dynamically between two soft touchbands: (1) touchband-1-set operation is specified as three-finger tap gesture which is used to set the touchband index=1 and select the soft touchband 1. (2) touchband-2-set operation is specified as three-finger double tap gesture which is used to set the touchband index=2 and select the soft touchband 2. These two operations are global operations. They are active no matter the active soft touchband index is 1 or 2. They set the active soft touchband index.

Whenever detected the touchband-1-set operation, the touchband index is set to 1. All the operations defined for the soft touchband 1 are active and can be used for the operation function meanwhile all the operations defined for the soft touchband 2 are inactive.

Whenever detected the touchband-2-set operation, the touchband index is set to 2. All the operations defined for the soft touchband 2 are active and can be used for the operation function meanwhile all the operations defined for the soft touchband 1 are inactive.

For two soft touchbands, the context-dependent touchband operation assignment could be similar with two independent touchbands shown in FIG. 9 except that two global touchband-set operation are added and four command-tap operations are specified differently:

Two global touchband-set operations are specified as:

touchband-1-set operation is specified as three-finger tap gesture touchband-2-set operation is specified as three-finger double tap gesture.

Five menu-tap operations and a menu-drag operation are specified for soft touchbands 1:

One-finger long press gesture is specified as for menu-on/off operation;

One-finger mini-down-drag gesture is specified as menu-down operation;

One-finger mini-up-drag gesture is specified as menu-up operation.

One-finger tap gesture is specified as menu-right operation;

One-finger double tap gesture is specified as menu-left operation;

One-finger horizontal drag gesture is specified as menu-drag operation.

Two-finger and three-finger horizontal drag gestures are specified as two control-drag operations with index 1 and 2.

Four tap gestures (Two-finger tap gesture, two-finger double tap gesture, two-finger long press gesture, three-finger long press gesture) are specified as four command-tap operations with index from 1 to 4.

For the soft touchband 2, three horizontal drag gestures are specified as three control-drag operations with index from 3 to 5. Six tap gestures (one-finger tap gesture, one-finger double tap gesture, two-finger tap gesture, two-finger double tap gesture, two-finger long press gesture, three-finger long press gesture) are specified as six command-tap operations with index from 5 to 10.

When the soft touchband 1 is active, all the menu operations are active and can be used to move the highlight in the context-dependent menu structure. After selecting a menu item, the first two command-tap operations and the first four control-drag operations can be instantly used. If other drag-control functions or tap commands need to be executed, the touchband-2-set operation sets the soft touchband 2 to be active. Then the control-drag operations and the command-tap operations defined on the soft touchband 2 can be used for the operation functions.

The displayed context-dependent menu uses specific background color or sign for the commands and functions specified on the active soft touchband. It helps the users to use the operations correctly.

For two soft touchbands with the operation assignment in Table 3, five control-drag operations and ten command-tap operations are specified. So, every menu item in the context-dependent menu structure could have up to five drag-control functions and up to six tap commands.

The context-dependent menu structure shown in FIGS. 12A to 12C can be used for two soft touchbands with the operation assignment shown in Table 3.

FIGS. 12A to 12C are the general context-dependent menu format. Two-layer menu format shows the active menu layer and the content of the highlighted menu item in the active menu layer.

Table 4 shown in FIG. 11 is an operation assignment table for the laptop original touchpad working in the context-dependent mode.

To share the original laptop touchpad, a touchpad mode switch key Tcb is used to toggle the touchpad working mode between the original mode and the context-dependent mode. The switch key Tcb is disposed at the side of the touchpad and a status indicator LED light is added under the switch key Tcb.

Clicking the switch key Tcb toggles the touchpad mode between the original mode and the context-dependent mode. The mode indicating light beneath the switch key turns on when the mode is in the context-dependent mode.

Whenever switching from the original mode to the context-dependent mode, the control variable menu_Display is set to "on". Whenever switching from the context-dependent mode to the original mode, variable menu_Display is set to "off".

In the context-dependent mode, the main drag gestures include all vertical drag gestures and all the horizontal drag gestures. More main drag gestures help user to change more drag-control functions without any menu switching operation.

In Table 4, three menu-tap operations and a menu-drag operation are specified as:

One-finger tap gesture is specified as menu-down operation;

One-finger double tap gesture is specified as menu-up operation;

One-finger horizontal drag gesture is specified as menu-drag operation;

Five other drag gestures (two-finger horizontal drag gesture, three-finger horizontal drag gesture, one-finger vertical drag gesture, two-finger vertical drag gesture and three-finger vertical drag gesture) are specified as five control-drag operations with index from 1 to 5.

Seven tap gestures (two-finger tap gesture, two-finger double tap gesture, three-finger tap gesture, three-finger double tap gesture, one-finger long press gesture, two-finger long press gesture and three-finger long press gesture) are specified as seven command-tap operations with index from 1 to 7. If the touchpad supports 4-finger drag gesture, more control-drag operations and more command-tap operations can be specified and used.

For the laptop original touchpad working in the context-dependent mode and with the operation assignment in Table 4 shown in FIG. five control-drag operations and seven command-tap operations are specified. So, every menu item in the context-dependent menu structure could have up to 5 drag-control functions and up to 7 tap commands. Each operation function is driven by an individual operation. Switching between all the operations are very easy because they are tap and drag gestures on the touchbands.

The context-dependent menu structure shown in FIGS. 12A to 12C can be used for the laptop touchpad working in the context-dependent mode.

FIG. 12A is the top menu diagram 100 of a general context-dependent menu interface for multiple touchbands. This menu format can be used for the operation assignments shown in FIGS. 9, 10 and 11. The context-dependent menu interface displays two-layer menu format wherein the top layer is the active menu layer and the second layer is the contents of the highlighted menu item in the active menu layer. The tap commands and the drag-control functions in the second layer are grouped according to their touchband index. For example, the commands and functions in the group 1 are driven by the operations specified on the touchband 1. Similarly, the commands and functions in the group 2 are driven by the operations specified on the touchband 2. This makes users easy to locate the correct touchband for their operations.

In the diagram 100, the active menu layer includes 8 menu items. The highlighted menu item is the first menu item 101 ("Top Menu11"). With the menu-right operation, menu-left operation or menu-drag operation, the highlight can be moved in the active menu layer. For example, with three menu-right operations, the highlight is moved to the menu item "Top Menu14". With another menu-right operation, the highlight is moved to the menu item "Top menu15". If the menu item "Top Menu15" is highlighted, with 2 menu-left operations, the highlight is moved to the menu item "Top Menu13". If the menu-drag operation is specified, the highlight movement is much easier because it can move the highlight in both directions and move the highlight fast.

The menu item 101 ("Top Menu11") contains six tap commands, five drag-control functions and a submenu structure. The contents are displayed at the second menu layer.

The tap commands and the drag-control functions are grouped according to the touchband index. For example, two tap commands ("T1", "T2") and two drag-control functions ("Ctrl Func1", "Ctrl Func2") are grouped into the group 1 and they are driven by the operations specified on the touchband 1. Similarly, four tap commands ("T3", "T4", "T5", "T6") and three drag-control functions ("Ctrl Func3", "Ctrl Func4", "Ctrl Func5") are grouped into the group 2 and they are driven by the operations specified on the touchband 2. The dark bar 103 is a mark that separates the group 1 and group 2. The commands and functions 102 are in the group 1. The commands and functions 104 are in the group 2. The submenu structure 105 includes 3 submenu items: "Menu 111", "Menu 112" and "Menu 113".

Six tap commands and five drag-control functions can be used instantly. For example, the second command-tap operation on the touchband 1 triggers the tap command "T2", the second control-drag operation on the touchband 2 changes the value of the drag-control function "Ctrl Fun4". the second command-tap operation on the touchband 2 triggers the tap command "T4".

When the menu item 101 ("Top Menu11") is highlighted, a menu-down operation moves the highlight down to the first submenu item "Menu 111".

When the context-dependent menu is displayed on the screen, a menu-on/off operation sets the control variable menu_Display to off and hides the context-dependent menu.

When the context-dependent menu has been hided, any specified operation on the touchband sets menu_Display=on and displays context-dependent menu on the screen.

FIG. 12B is the submenu format diagram 106 of the menu item "Menu Item 112". When the top menu item 101 ("Top Menu11") is highlighted, a menu-down operation moves the highlight to the first submenu item "Menu 111". Another menu-right operation moves the highlight from menu item "Menu 111" to the menu item "Menu 112". After menu item "Menu 112" is highlighted, its content is displayed at the second menu layer shown in the diagram 106.

The menu item 108 ("Menu 112") includes 6 tap commands, 5 drag-control functions and a submenu structure. The tap commands and drag-control functions are divided into two groups (107 and 110) by the mark 109. They are displayed on the second menu layer. The 6 tap commands ("T1", "T2", "T3", "T4", "T5", "T6") and 5 drag-control functions ("Ctrl Fun1", "Ctrl Fun2", "Ctrl Fun3", "Ctrl Fun4", "Ctrl Fun5") can be triggered or driven instantly by their respective operations on the touchband 1 and 2.

Because the menu item 108 ("Menu 112") includes a submenu structure, a menu-down operation moves the highlight down to the first submenu item "Menu 1121" shown in the diagram 106.

After finishing adjusting for the menu item 108 ("Menu 112"), the menu-right operation, menu-left operation or menu-drag operation can move the highlight to other menu items in the active menu layer. Or a menu-up operation moves the highlight back to the parent menu item 101 ("Menu 11") shown in the diagram 100.

FIG. 12C is the submenu format diagram 112 of the menu item "Menu Item 1121". When the menu item 108 ("Menu 112") in the diagram 106 is highlighted, a menu-down operation moves the highlight to the first submenu item "Menu 1121". The menu item "Menu 1121" is a bottom menu item. It does not include any submenu structure.

The menu item 113 ("Menu 1121") includes 6 tap commands and 5 drag-control functions. The tap commands and drag-control functions are divided into two groups (114 and 116) according to the touchband on which the operations are defined.

After finishing adjusting for the menu item "Menu 1121", the menu-right operation, menu-left operation or menu-drag operation can move the highlight to other menu items in the active menu layer. Or a menu-up operation moves the highlight back to the parent menu item "Menu 112".

FIGS. 13A~13D show 4 diagrams for an example of the context-dependent menu interface used for a photo editing application which uses the context-dependent touchband operation assignment tables shown in FIGS. 9, 10, and 11.

FIG. 13A is the top menu structure diagram 117 wherein the top menu layer has 9 menu items. The highlighted menu item is the first menu item 118 ("System"). With the menu operations, the highlight can be moved in the active menu layer or moved downward to the submenu layer. For example, with 5 menu-right operations, the highlight is moved to the menu item "Color". A menu-left operation moves the highlight from menu item "Color" to the menu item "Tone Curve".

The highlighted menu item 118 ("System") includes six tap commands and five drag-control functions. They are divided into two groups based on the touchband index. The first group includes two tap commands ("Backward Page", "Forward Page") and two drag-control functions ("Vertical Scroll", "Zoom") which are triggered or driven by the command-tap operations and control-drag operations on the touchband 1. For example, the first command-tap operation on the touchband 1 triggers the command "Backward Page". The first control-drag operation on the touchband 1 scrolls display in vertical direction. The second group includes four tap commands ("Home", "End", "Undo" and "Redo") and three drag-control functions ("Rotate", "Volume" and "Brightness") which are triggered or driven by the command-tap operations and control-drag operations defined on the touchband 2. For example, the third command-tap operation on the touchband 2 triggers the command "Undo". The first control-drag operation on the touchband 2 rotates the display.

When the context-dependent menu is displayed on the screen, a menu-on/off operation sets the control variable menu_Display to off and hides the context-dependent menu.

When the context-dependent menu has been hided, any specified operation on the touchband sets menu_Display=on and displays context-dependent menu on the screen.

FIG. 13B shows the top menu structure diagram 122 when the highlight is moved from the menu item 118 ("System") in the diagram 117 to the menu item 125 ("Color") in the top menu layer shown in the diagram 122.

The top menu item "Color" includes four tap commands 123, two drag-control functions 124 and a submenu structure which has 4 menu items. All four tap commands and 2 drag-control functions are triggered or driven by the operations defined on the touchband 1.

Four tap commands ("Undo", "Redo", "Hue−" and "Hue+") and two drag-control functions ("Saturation" and "Luminance") are used for adjusting for all colors and can be triggered or driven instantly by four command-tap operations and two control-drag operations on the touchband 1:

The diagram 122 shows that "Hue" for all colors has been changed to "+2" by the third command-tap operation; "Saturation" has been changed to "+4" by the first control-drag operation on the touchband 1; "Luminance" has been changed to "−2" by the second control-drag operation on the touchband 1.

During adjusting for all colors with command-tap operations and control-drag operations, the menu-right operation and menu-left operation move the highlight to other menu items in the top menu layer shown in the diagram 122.

FIG. 13C shows the submenu structure diagram 127 of the menu item "Yellow/Green".

A menu-down operation moves the highlight from the menu item 125 ("Color") to the first submenu item "Red/Orange". With one menu-right operations, the highlight is moved to the second menu item 128 ("Yellow/Green"). The menu item 128 ("Yellow/Green") does not include any submenu structure.

The menu item "Yellow/Green" includes six tap commands and four drag-control functions for adjusting color "Yellow" and color "Green". They are divided into two groups (129 and 131) by the separator 130: the tap commands and drag-control functions in the group 129 are used for adjusting the color "Yellow" and driven by the operations defined on the touchband 1; the tap commands and drag-control functions in the group 131 are used for adjusting the color "Green" and they are driven by the operations defined on the touchband 2.

The diagram 127 shows the result after adjusting: "Y: Hue" of "Yellow" has been changed to "−1"; "Saturation Y" of "Yellow" has been changed to "+10"; Luminance Y" of "Yellow" has been changed to "−5"; "G: Hue" of "Green" has been changed to "+1"; "Saturation G" of "Green" has been changed to "+12"; Luminance G" of "Green" has been changed to "−9".

After finishing adjusting for the color "Yellow/Green", the menu-right operation and menu-left operation move the highlight to other colors in the active menu layer for adjusting.

FIG. 13D shows the submenu layer structure diagram 132 of the menu item "Purple/Magenta".

With two menu-right operations, the highlight is moved from the color 128 ("Yellow/Green") shown in the diagram 127 to the fourth menu item 133 ("Purple/Magenta") shown in the diagram 132. Adjusting for "Purple/Magenta" is totally same as that for the color "Yellow/Green".

The menu item 133 ("Purple/Magenta") has six tap commands and four drag-control functions for adjusting color "Purple" and color "Magenta". They are divided into two groups (134 and 136) by the separator 135: the tap commands ("Undo", "Redo", "P: Hue−" and "P: Hue+") and drag-control functions ("Saturation P" and "Luminance P") in the group 134 are used for adjusting the color "Purple" and driven by the operations defined on the touchband 1; the tap commands ("M: Hue−" and "M: Hue+") and drag-control functions ("Saturation M" and "Luminance M") in the group 136 are used for adjusting the color "Magenta" and they are driven by the operations defined on the touchband 2.

FIG. 13D shows the result after changing: "P: Hue" of "Purple" has been changed to "+2"; "Saturation P" of "Purple" has been changed to "−7"; "Luminance P" of "Purple" has been changed to "−3"; "M: Hue" of "Magenta" has been changed to "−1"; "Saturation M" of "Magenta" has been changed to "+8"; Luminance M" of "Magenta" has been changed to "+5".

After finishing adjusting for the color "Purple/Magenta", the menu-right operation and menu-left operation move the highlight to other colors in the active menu layer for adjusting.

A menu-up operation moves the highlight back to the parent menu item 125 ("Color") in the diagram 122.

FIG. 14 shows the applications that the context-dependent touchband can support.

There are a lot of dedicated control panel devices which are used to support photo editing, video editing, color grading, audio editing software such as:
(1) Palette Professional Kit Customizable Controller for Photo & Video Editing with Adobe Lightroom, Adobe Photoshop, Adobe Premiere Pro
(2) Blackmagic Design Davinci Resolve Mini Panel for video editing
(3) Loupedeck Photo Editing Console for Adobe Lightroom
(4) Tangent Wave Panel for color grading.
(5) Tangent Element Bundle of Tk, Mf, Bt Panel for color grading.

All these dedicated input control tools are used for specific applications. Usually when they are used in editing, the keyboard and the pointing device such as mouse or digital pen have to be used.

The context-dependent touchbands work with the context-dependent menu user interface. It can support most of the photo, video, audio editing applications with its easy, quick and comfortable manipulation style. Comparing with the dedicated control panel devices, the touchbands are the smallest in size, it is closer to the computer keyboard and easier to switch between the touchbands and the keyboard.

With the help of the context-dependent menu displayed on the screen, the touchbands on the keyboard function as a multi-functional control panel which has a plurality of control buttons and a plurality of control sliders on the panel. With so many control buttons and control sliders, the context-dependent menu structure can be significantly simplified. At the same time, the operations can be significantly simplified.

Because all the menu operations for the context-dependent touchband are location insensitive and all the control-drag operations (main drag gestures) are related only to the drag direction and drag distance. When using the context-dependent touchbands, the users don't need to move their eyesight from the screen to their fingertips. They can select the menu on the display by tap the touchband with ease and certainty. For any selected menu item, users can change multiple control items. They can switch the different controls inside one selected menu item just by change their finger numbers or action style (tap or drag). For example, using one-finger drag gesture to adjust the saturation of the selected color, then using two-finger drag gesture to adjust the luminance of the selected color, then using three-finger drag gesture to adjust the hue of the selected color. All these operation switching does not need changing their hand position. Main drag gestures on the touchbands gives user more certainty and with less force.

The context-dependent touchbands can support the video editing applications such as Adobe Premiere Pro; Apple Final Cut Pro X; Corel VideoStudio Ultimate; Sony Catalyst Production Suite.

The context-dependent touchband can support the audio editing applications such as Adobe Audition; Apple Logic Pro X The context-dependent touchband can support the CAD Design tool applications such as AutoCAD and TurboCAD.

The methods and systems described above can be used alone or in various combinations. The methods may be implemented singularly or by a combination of hardware, software, and/or firmware.

While this invention has been described in terms of several preferred embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer system comprising:
a keyboard with a plurality of touchbands, each of which is a narrow multi-touch touchpad;
a display device;
a computer touchband device application program executable on the computer processor configured to:
manage a multi-level context-dependent cascading menu interface wherein each menu item includes a plurality of drag-control functions driven by independent control-drag operations on the touchbands, a plurality of tap commands triggered by independent command-tap operations on the touchbands and a plurality of submenu items;
display two-layer horizontal menu with the active menu layer on top and the content of the highlighted menu item under the active menu layer;
create a control variable menu_Display with two possible values: {off=0, on=1};
display the context-dependent menu when menu_Display=on;
hide the context-dependent menu when menu_Display=off;
specify five menu-tap operations: a menu-down operation, a menu-up operation, a menu-right operation, a menu-left operation and a menu-on/off operation from the tap gestures and mini-drag gestures on the touchband 1;
specify a menu-drag operation from the main drag gestures on the touchband 1 wherein the main drag gesture is the drag gesture along the long side of the touchband;
move the highlight to the first submenu item layer when detected menu-down operation;
move the highlight back to the parent menu item when detected menu-up operation;
move the highlight to the adjacent menu item on the right in the active menu layer when detected menu-right operation;
move the highlight to the adjacent menu item on the left in the active menu layer when detected menu-left operation;
move the highlight to both sides in the same menu layer when detected menu-drag operation;
specify a plurality of control-drag operations from available main drag gestures on all touchbands;
specify a plurality of command-tap operations from available tap gestures and mini-drag gestures on all touchbands;
change the value of the k-th drag-control function listed for the highlighted menu item when detected the control-drag operation with index k;
trigger the m-th tap command listed for the highlighted menu item when detected the command-tap operation with index m;
specify a tap command for a menu item as a menu switching command that changes the highlight to a specified menu item in the context-dependent menu structure;
toggle the menu_Display value whenever detected menu-on/off operation;
set menu_Display=off when no-operation exceeds the specified time limit;
set menu_Display=on when detected any operation on the touchbands during the context-dependent menu is hided.

2. The computer system according to claim 1, wherein keyboard is one of following keyboards: (1) the keyboard for the desktop computer, (2) the laptop keyboard and (3) the keyboard for the tablet computer.

3. The computer system according to claim 1, wherein the touchbands are either horizontal touchbands or vertical touchbands disposed on the keyboard.

4. The computer system according to claim 1, wherein the touchband is the original touchpad on the laptop keyboard with a touchpad mode switch key is set around the touchpad wherein the touchpad mode is toggled between the original mode and the context-dependent mode by the switch key and indicated by a mode indicating light under the switch key wherein the light is on when the touchpad is in the context-dependent mode.

5. The computer system according to claim 1, wherein the touchband is the original touchpad on the laptop keyboard working in the context-dependent mode, and the main drag gestures includes all vertical drag gesture and all horizontal drag gestures.

6. The computer system according to claim 1, wherein the active menu layer of context-dependent menu is display vertically on the display device, the contents of the highlighted menu item in the active menu layer is displayed vertically on the right side of the highlight.

7. The computer system according to claim 1, wherein the main drag gestures are the drag gestures along the long side of the touchband and include one- to multiple-finger main drag gestures supported by the touchbands.

8. The computer system according to claim 1, wherein the mini-drag gestures are the drag gestures along the short side of the touchband and include one- to multiple-finger mini drag gestures supported by the touchbands.

9. The computer system according to claim 1, wherein tap gestures are the following gestures supported by the touchbands: one- to multiple-finger tap, one- to multiple-finger double tap, one- to multiple-finger long press.

10. The computer system according to claim 1, wherein the context-dependent menu includes system tool control menu items wherein the drag-control functions in the system menu items are configurable by the computer touchband device application program.

11. The computer system according to claim 1, wherein the drag-control functions, the tap commands and the submenu items listed for the highlighted menu item are distinguished by different background colors.

12. The computer system according to claim 1, wherein each drag-control function and the tap command listed for the highlighted context-dependent menu item begins with its index number.

13. The computer system according to claim 1, wherein each drag-control function and the tap command listed for the highlighted context-dependent menu item contains a gesture-specific icon.

14. The computer system according to claim 1, wherein a plurality of soft touchbands share a physical touchband, a global touchband-switch operation is specified from the available tap gestures and mini-drag gestures on the shared touchband to cycle the selection of soft touchbands; the tap commands and the drag-control functions belongs to the active soft touchband has specific background color.

15. The computer system according to claim 1, wherein a plurality of soft touchbands share a physical touchband, a set of global touchband-set operations are specified from the available tap gestures and mini-drag gestures on the shared physical touchband to select soft touchbands; the tap commands and the drag-control functions belongs to the active soft touchband has different background color.

16. The computer system according to claim 1, wherein the tap commands and the drag-control functions listed for the highlighted menu item are grouped according to their touchband index.

17. The computer system according to claim 1, wherein all the functional keys are redefined when menu_Display=on; clicking operations on the functional keys Fn are specified as command-click operations and each command-click operation has the same index as its respective functional key.

* * * * *